(12) United States Patent
Kanaoka et al.

(10) Patent No.: US 10,965,825 B2
(45) Date of Patent: Mar. 30, 2021

(54) IMAGE READING APPARATUS COMPRISING DISPLAY PANEL WHICH SERVES AS OPERATION PORTION AND IMAGE READER, IMAGE FORMING APPARATUS, NON-TRANSITORY STORAGE MEDIUM, AND CONTROL METHOD

(71) Applicant: SHARP KABUSHIKI KAISHA, Sakai (JP)

(72) Inventors: Yukio Kanaoka, Sakai (JP); Masaaki Aida, Sakai (JP); Hidetoshi Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/495,036

(22) PCT Filed: Feb. 15, 2018

(86) PCT No.: PCT/JP2018/005332
§ 371 (c)(1),
(2) Date: Sep. 17, 2019

(87) PCT Pub. No.: WO2018/173568
PCT Pub. Date: Sep. 27, 2018

(65) Prior Publication Data
US 2020/0028981 A1    Jan. 23, 2020

(30) Foreign Application Priority Data
Mar. 23, 2017  (JP) .............................. JP2017-056850

(51) Int. Cl.
*H04N 1/04*   (2006.01)
*H04N 1/00*   (2006.01)

(52) U.S. Cl.
CPC ..... *H04N 1/00411* (2013.01); *H04N 1/00413* (2013.01); *H04N 1/00482* (2013.01); *H04N 2201/0081* (2013.01)

(58) Field of Classification Search
None
See application file for complete search history.

(56) References Cited

U.S. PATENT DOCUMENTS

| | | | |
|---|---|---|---|
| 7,755,807 B2 * | 7/2010 | Asaoka | H04N 1/00408 250/208.1 |
| 8,698,742 B2 * | 4/2014 | Mimura | H04N 1/00204 345/157 |

(Continued)

FOREIGN PATENT DOCUMENTS

| | | |
|---|---|---|
| JP | 2005-244755 A | 9/2005 |
| JP | 2009-188851 A | 8/2009 |

(Continued)

*Primary Examiner* — Dung D Tran
(74) *Attorney, Agent, or Firm* — ScienBiziP, P.C.

(57) ABSTRACT

Problem: To be able to reduce manufacturing cost and achieve downsizing of an apparatus.
Solution: An image forming apparatus 10 includes a CPU (82), an image former (14), and a display panel 48. The display panel 48 serves as a display portion 48*a* which displays an image, an image reader 48*b* which reads a document placed on a display surface, and an operation portion 48*c* which receives an input operation by a user. The CPU (82) detects a document area where the document exists on the display surface of the display panel 48, and causes the operation portion 48*c* to be displayed at a position according to the detected document area on the display panel 48.

8 Claims, 16 Drawing Sheets

(56) References Cited

U.S. PATENT DOCUMENTS

| | | | |
|---|---|---|---|
| 8,941,894 B2* | 1/2015 | Tanaka | H04N 1/40056 |
| | | | 358/474 |
| 9,191,532 B2* | 11/2015 | Kido | H04N 1/0044 |
| 2009/0190152 A1* | 7/2009 | Takatani | H04N 1/00708 |
| | | | 358/1.13 |
| 2009/0201517 A1 | 8/2009 | Soda et al. | |
| 2009/0201543 A1* | 8/2009 | Tonami | H04N 1/00432 |
| | | | 358/1.15 |
| 2011/0181900 A1* | 7/2011 | Suese | H04N 1/0074 |
| | | | 358/1.13 |
| 2011/0222088 A1* | 9/2011 | Fukuda | G03G 15/55 |
| | | | 358/1.12 |

FOREIGN PATENT DOCUMENTS

| | | |
|---|---|---|
| JP | 2009-194419 A | 8/2009 |
| JP | 2009-232033 A | 10/2009 |
| JP | 2013-126256 A | 6/2013 |

\* cited by examiner

IMAGE READING APPARATUS COMPRISING DISPLAY PANEL WHICH SERVES AS OPERATION PORTION AND IMAGE READER, IMAGE FORMING APPARATUS, NON-TRANSITORY STORAGE MEDIUM, AND CONTROL METHOD

TECHNICAL FIELD

The present invention relates to an image reading apparatus, an image forming apparatus, a control program, and a control method, and more particularly, to an image reading apparatus and an image forming apparatus provided with a display panel which displays an image, a control program, and a control method.

BACKGROUND ART

Patent Literature 1 discloses an example of an image reading apparatus of the background art. The image reading apparatus of the background art is provided with contact glass, a liquid crystal panel, a light-emitting portion, and an operation portion. The contact glass is provided on an upper surface of the image reading apparatus. The liquid crystal panel is placed below the contact glass in an overlapping manner. The light-emitting portion is provided within the image reading apparatus, and emits light from the lower side toward the contact glass. The operation portion includes a display and various operation keys, and is provided at a position different from the position of the contact glass on the upper surface of the image reading apparatus.

CITATION LIST

Patent Literature

[PTL 1]
Japanese Unexamined Patent Application Publication No. 2005-244755

SUMMARY OF INVENTION

Technical Problem

However, in the image reading apparatus of the background art, an image reading area for reading an image including the contact glass, the liquid crystal panel, and the like, and the operation portion which receives an operation of a user are separately provided. Therefore, a space for separately arranging the image reading area and the operation portion is required, which leads to increasing of the size of the apparatus. Further, in the image reading apparatus of the background art, since a plurality of parts each having multiple display functions are provided, problems that the number of parts is increased and the manufacturing cost is increased arise.

Accordingly, the main object of the present invention is to provide an image reading apparatus, an image forming apparatus, a control program, and a control method that are new.

Another object of the present invention is to provide an image reading apparatus, an image forming apparatus, a control program, and a control method whereby reduction of the manufacturing cost and downsizing of the apparatus can be achieved.

Solution to Problem

A first invention is an image reading apparatus including a display panel, detection means, and display control means. The display panel is a liquid crystal panel with built-in sensors in which an optical sensor is built into each pixel of the liquid crystal panel, and serves as a display portion which displays an image, an operation portion which receives an input operation by a user, and an image reader which reads a document. The detection means detects a document area where the document exists in a display area of the display panel. The display control means causes the operation portion to be displayed at a position according to the document area detected by the detection means, in the display area of the display panel.

According to the first invention, the display panel serves as the display portion which displays an image, the operation portion which receives an input operation by the user, and the image reader which reads a document placed on a display surface. Thus, it is possible to reduce the manufacturing cost, and achieve downsizing of the apparatus. Further, according to the first invention, the operation portion is displayed at a position according to the document area. The user can thus place a document on the display panel without restraint, which is convenient.

A second invention is the image reading apparatus dependent from the first invention, in which the display control means causes the operation portion to be displayed in an off-document area outside the document area.

In the second invention, since the operation portion is to be displayed in the off-document area outside the document area, in a case where the operation portion and the document area overlap each other, the operation portion is moved to the off-document area outside the document area. Accordingly, even if a document is placed on the operation portion, the user can operate the operation portion.

A third invention is the image reading apparatus dependent from the second invention, in which the display control means causes the operation portion to be displayed at a position where the document area and a part of the operation portion are located within a predetermined distance from each other.

According to the third embodiment, since the operation portion is displayed at a position where a part of the operation portion and the document area are located within a predetermined distance from each other, the user is enabled to easily recognize the operation portion, and also easily operate the operation portion.

A fourth invention is an image reading apparatus dependent from any one of the first to third inventions, in which the display control means changes the display size of the operation portion according to the document area.

According to the fourth invention, since the display size of the operation portion is changed according to the document area, the user is enabled to easily recognize the operation portion, and also easily operate the operation portion. Therefore, the operability of the image reading apparatus can be improved.

A fifth invention is the image reading apparatus dependent from any one of the first to fourth inventions, in which: the display area of the display panel is divided into a plurality of divided areas; an order of priority fix displaying the operation portion is set to each of the plurality of divided areas; and the display control means causes the operation portion to be displayed in one of the plurality of divided areas in accordance with the order of priority.

According to the fifth invention, since the order of priority for displaying the operation portion is set to each of the plurality of divided areas, and the operation portion is displayed in one of the plurality of divided areas in accordance with the order of priority, the user can predict an area in which the operation portion is to be displayed.

A sixth invention is an image forming apparatus comprising the image reading apparatus according to any one of claims 1 to 5.

Also in the sixth invention, similarly to the first invention, reduction of the manufacturing cost and downsizing of the apparatus can be achieved.

A seventh invention is the image forming apparatus dependent from the sixth invention, in which the display panel constitutes a top plate of the image forming apparatus.

According to the seventh invention, since the display panel constitutes the top plate of the image forming apparatus, it is possible to make the display surface of the display panel 48 large in size. Accordingly, in a case where the display panel serves as the display portion, the user can easily visually recognize the display portion. In addition, in a case where the display panel serves as the image reader, since the degree of freedom of a place for arranging the document is increased, the above feature is convenient.

An eighth invention is a control program executed by a processor of an image reading apparatus including a display panel, which serves as a display portion that displays an image, an operation portion that receives an input operation by a user, and an image reader that reads a document, whereby the processor of the image reading apparatus is made to function as: detection means for detecting a document area where the document exists in a display area of the display panel; and display control means for causing the operation portion to be displayed at a position according to the document area detected by the detection means, in the display area of the display panel.

A ninth invention pertains to a processor of an image reading apparatus including a display panel, which serves as a display portion that displays an image, an operation portion that receives an input operation by a user, and an image reader that reads a document, and the processor executes: (a) detecting a document area where the document exists in a display area of the display panel; and (b) causing the operation portion to be displayed at a position according to the document area detected in the step (a), in the display area of the display panel.

Also in the eighth and ninth inventions, similarly to the first invention, reduction of the manufacturing cost and downsizing of the apparatus can be achieved.

Advantageous Effects of Invention

According to the present invention, reduction of the manufacturing cost and downsizing of the apparatus can be achieved.

DESCRIPTION OF EMBODIMENTS

First Embodiment

Figure 1:
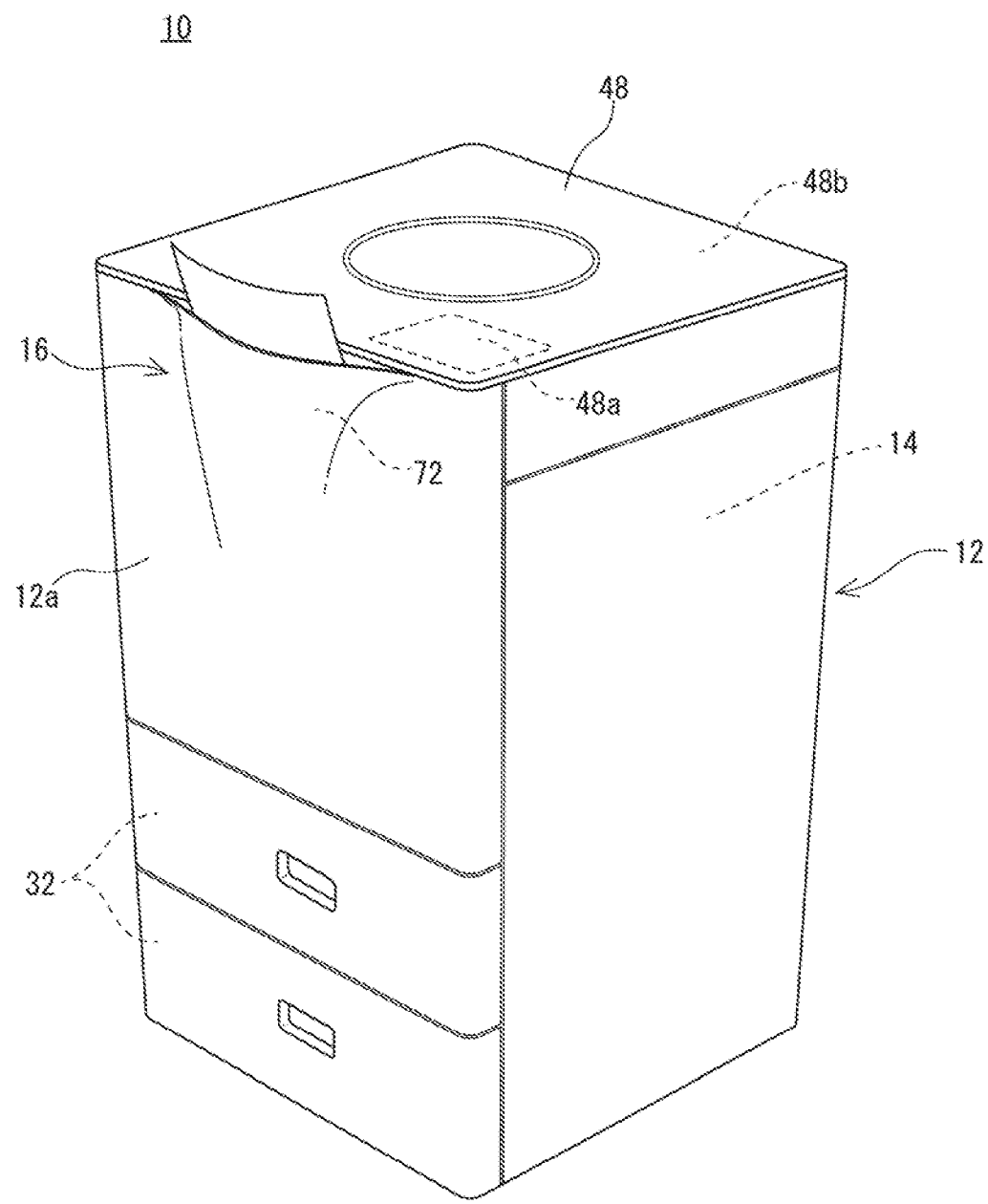
FIG. 1 is an illustration showing the outer appearance of an image forming apparatus according to a first embodiment of the present invention.
Figure 2:
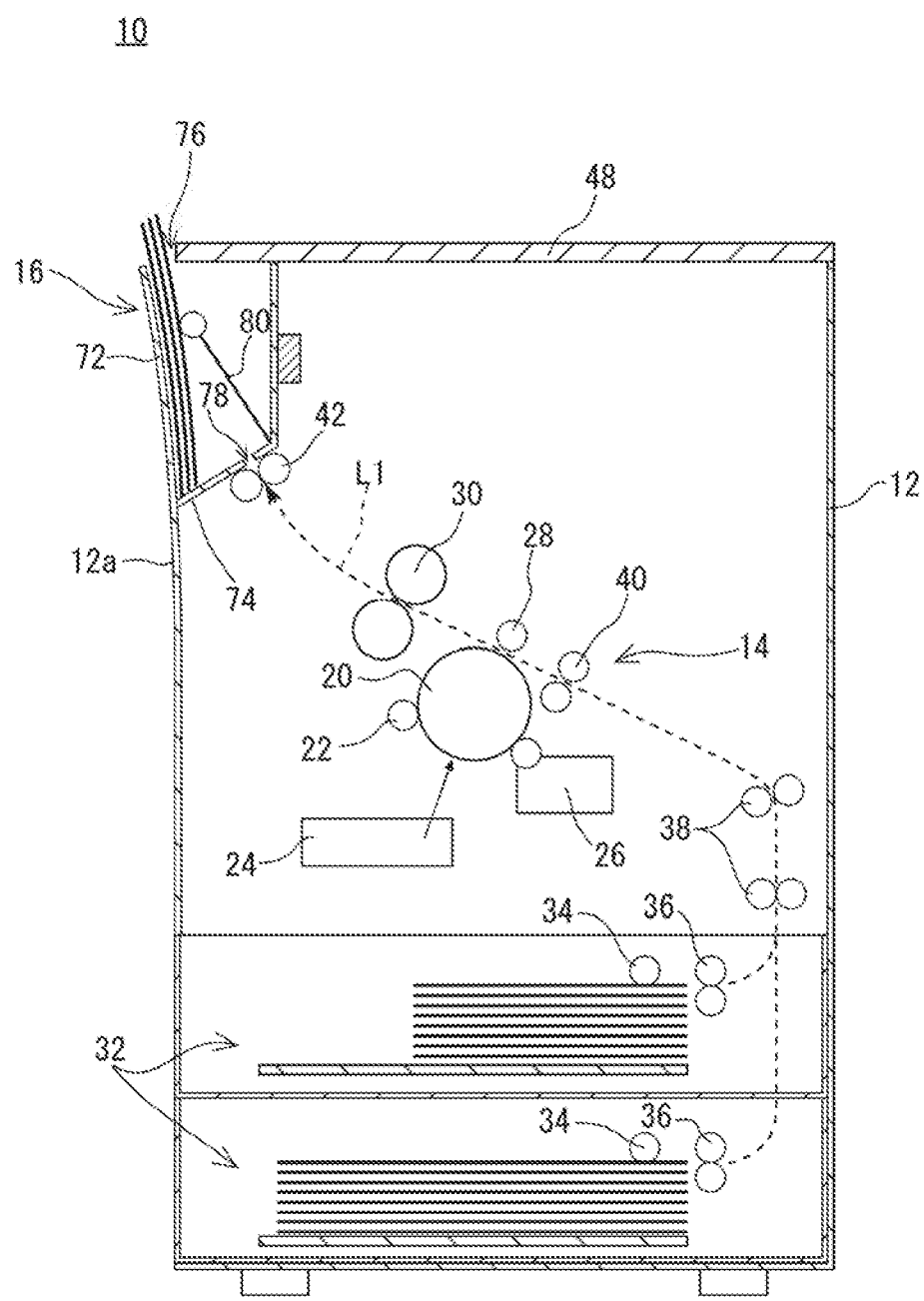
FIG. 2 is an illustration schematically showing the internal structure of the image forming apparatus of FIG. 1.

FIG. 1 is an illustration showing the outer appearance of an image forming apparatus 10 according to a first embodiment of the present invention. FIG. 2 is an illustration schematically showing the internal structure of the image forming apparatus 10 of FIG. 1.

Referring to FIG. 1, the image forming apparatus 10 according to the first embodiment of the present invention forms a multi-colored or monochromatic image on a sheet (a recording medium) by an electrophotographic method, and the sheet on which the image has been formed is discharged to a sheet discharge portion 16. In the first embodiment, the image forming apparatus 10 is an MFP (Multifunction Peripheral) having a copy function, a print function, a scanner function, a facsimile function, and the like.

In the first embodiment, a multifunction peripheral, which is provided with the print function, the scanner function, and the facsimile function, will be described as the image forming apparatus 10. However, the multifunction peripheral need not be limited to the above, and the print function and the facsimile function may be omitted as long as at least the scanner function is provided.

In the present specification, a front-back direction (depth direction) of the image forming apparatus 10 and the constituent elements of the image forming apparatus 10 is defined assuming a surface opposed to a user's standing position, in other word, a surface on which the sheet discharge portion 16 to be described later is provided, as a front surface (the front), and a right or left direction (lateral direction) of the image forming apparatus 10 and the constituent elements of the image forming apparatus 10 is defined on the basis of a state in which the image forming apparatus 10 is seen from the user.

First, the basic configuration of the image forming apparatus 10 will be schematically described. As shown in FIGS. 1 and 2, the image forming apparatus 10 includes a substantially rectangular parallelepiped housing 12, which is made of synthetic resin, in which an image former 14 and the like are incorporated. More specifically, as will be described later, in an upper part of the front side within the housing 12, the sheet discharge portion 16 including a sheet outlet 76 which is open upward is provided.

The image former 14 includes components such as a photosensitive drum 20, a charging roller 22, a writing unit 24, a developing unit 26, a transfer roller 28, and a fixing unit 30. The image former 14 forms an image on a sheet conveyed from a paper feeder 32, etc., provided on a lower part of the housing 12, and discharges the sheet on which the image has been formed to the sheet discharge portion 16. Note that as image data (print image data) for forming an image on the sheet, image data read by an image reader 48b (a display panel 48) to be described later, image data transmitted from an external computer, or the like, is used.

The photosensitive drum 20 is an image carrier having a photosensitive layer formed on a surface of a cylindrical substrate which is conductive, and the charging roller 22 is a member for causing the surface of the photosensitive drum 20 to be charged at a predetermined potential. Also, the writing unit 24 is configured as a laser scanning unit (LSU) including a laser irradiation portion, a reflection mirror, and the like, and forms an electrostatic latent image according to the image data on the surface of the photosensitive drum 20 by exposing the charged surface of the photosensitive drum 20 to light. The developing unit 26 yields an image from the electrostatic latent image formed on the surface of the photosensitive drum 20 by means of toner.

The transfer roller 28 is provided to form a transfer nip portion between the transfer roller 28 and the photosensitive drum 20. At the time of forming the image, as a predetermined voltage is applied to the transfer roller 28, a transfer electric field is formed at the transfer nip portion. Further, by the effect of the transfer electric field, a toner image formed on the surface of the photosensitive drum 20 is transferred on the sheet while the sheet passes through the transfer nip portion.

The fixing unit 30 includes a heat roller and a pressure roller, etc., and is disposed downstream of the transfer roller 28 in a sheet conveyance direction. The heat roller is set to be at a predetermined fixing temperature, and as the sheet passes through a fixing nip portion between the heat roller and the pressure roller, the toner image transferred on the sheet is melted, mixed, and pressed to have the toner image thermally fixed to the sheet.

Further, in the housing 12, a sheet conveyance path L1 for sending, to the sheet discharge portion 16 via the transfer nip portion and the fixing nip portion, a sheet fed from the paper feeder 32 by a pickup roller 34 and paper feeding rollers 36, is formed. In the sheet conveyance path L1, conveyance rollers 38 for applying a propulsive force to the sheet in an auxiliary manner, resist rollers 40 for feeding the sheet to the transfer nip portion at a predetermined timing, sheet discharge rollers 42 for discharging the sheet on which the image has been formed to the sheet discharge portion 16, and the like, are provided as appropriate.

Figure 3:
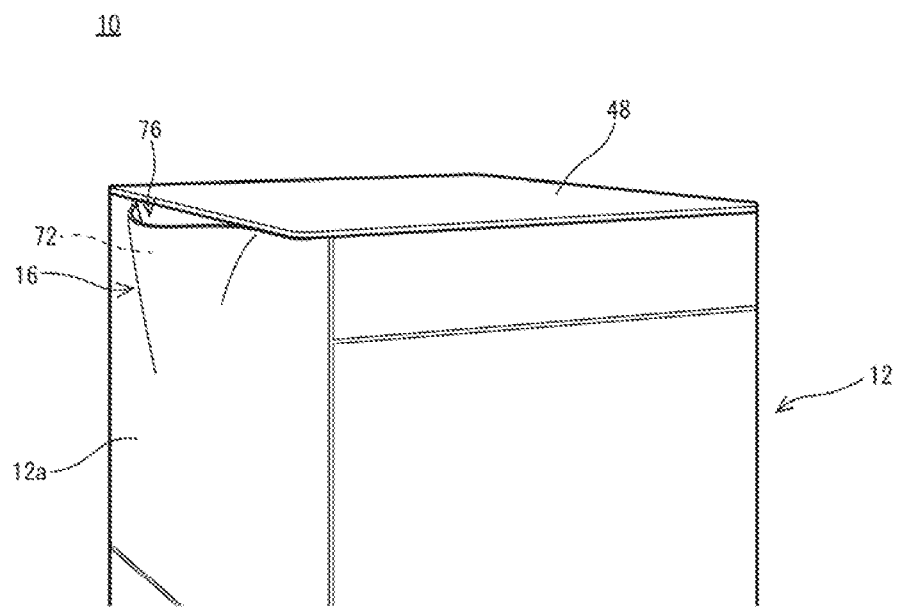
FIG. 3 is a perspective view showing an upper surface, an upper part of a front surface, and an upper part of a right surface of the image forming apparatus of FIG. 1.
Figure 4:
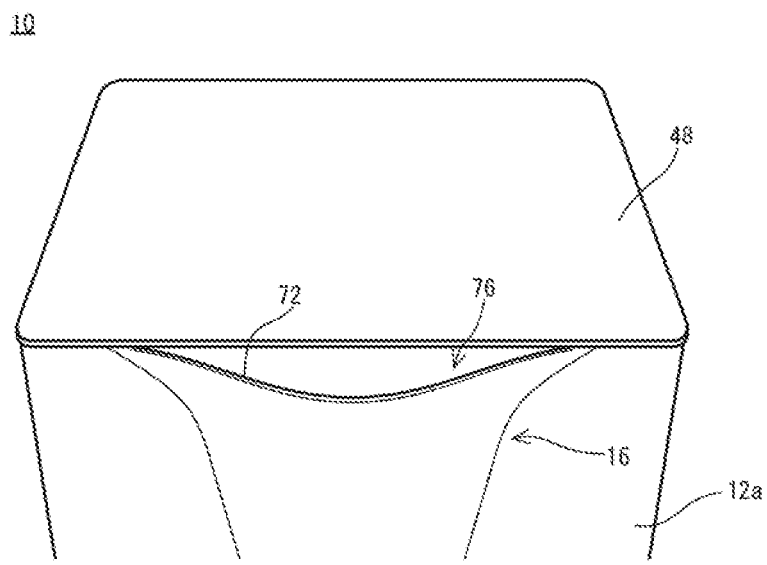
FIG. 4 is a perspective view showing the upper surface and the upper part of the front surface of the image forming apparatus of FIG. 1.

FIG. 3 is a perspective view showing an upper surface, an upper part of a front surface, and an upper part of a right surface of the image forming apparatus 10 of FIG. 1. FIG. 4 is a perspective view showing the upper surface and the upper part of the front surface of the image forming apparatus 10 of FIG. 1.

As shown in FIGS. 1 to 4, the sheet discharge portion 16 has a sheet discharge space from which (in which) the sheet with the image being formed by the image former 14 is discharged (accommodated). The sheet discharge portion 16 is arranged in a vertical orientation at a peripheral portion within the housing 12, and is open upward. In the first embodiment, the sheet discharge portion 16 is disposed at the upper part of the front side within the housing 12.

Specifically, the sheet discharge portion 16 is provided with a sheet discharge tray 72 supporting the front or the back of the image-formed sheet discharged into the sheet discharge portion 16, a rear-end support portion 74 supporting the rear end of the sheet in the sheet discharge direction, and the sheet outlet 76 for taking the sheet outside the sheet discharge portion 16.

Further, in the first embodiment, the inner surface side of a front wall 12a of the housing 12 is used as the sheet discharge tray 72. That is, the sheet discharge tray 72 is provided in such a way that the sheet discharge tray 72 is integrally formed with the front wall 12a and extends in substantially the vertical direction, and the front side of the sheet discharge portion 16 is covered by the front wall 12a serving as the sheet discharge tray 72. Further, the rear-end support portion 74 is provided to be inclined slightly downward toward the sheet discharge tray 72. At an end portion of the rear-end support portion 74 opposite to the sheet discharge tray 72, a sheet discharge port 78 for discharging the image-formed sheet to the sheet discharge portion 16 is formed. The sheet discharge rollers 42 described above are provided at the lower side of the sheet discharge port 78. Further, the sheet outlet 76 is formed in an upper part of the sheet discharge space of the sheet discharge portion 16, and is open upward.

That is, in the first embodiment, the sheet on which the image has been formed is discharged substantially vertically upward relative to the sheet discharge portion 16 (in other words, placed in a portrait orientation), and is drawn upward by the user from the sheet outlet 76 (see FIGS. 1 and 2).

In addition, the sheet discharge portion 16 is provided with a sheet presser 80 that presses the sheet against the sheet discharge tray 72. The sheet discharged to the sheet discharge portion 16 is appropriately collected toward the sheet discharge tray 72 by the inclination of the rear-end support portion 74 and the pressure of the sheet presser 80.

Further, on the upper part of the housing 12, the display panel 48 having a substantially rectangular flat shape which constitutes a top plate (upper wall) of the housing 12 is provided. In other words, the display panel 48 constitutes the top plate of the image forming apparatus 10. In the first embodiment, the display panel 48 is a liquid crystal panel with built-in sensors in which an optical sensor is built into each pixel of the liquid crystal panel, and includes a plurality of pixels arranged in a matrix and an optical sensor 58 (FIG. 5) provided in each of the pixels. Apart from an image display function of displaying an image, the display panel 48 has an image reading function of reading the image, and a touch detection function of detecting a position where the user pointed (touched).

The specific structure of the display panel 48 having the image display function, the image reading function, and the touch detection function is disclosed in Japanese Unexamined Patent Application Publication No. 2010-62940, the applicant of which is the same as the present application, so the above-identified publication should be referred to. By using the display panel 48 as described above, the apparatus can be made slim, and convenience and the appearance of the image forming apparatus 10 are improved. However, the specific structure of the display panel 48 can be changed as appropriate.

Figure 5:
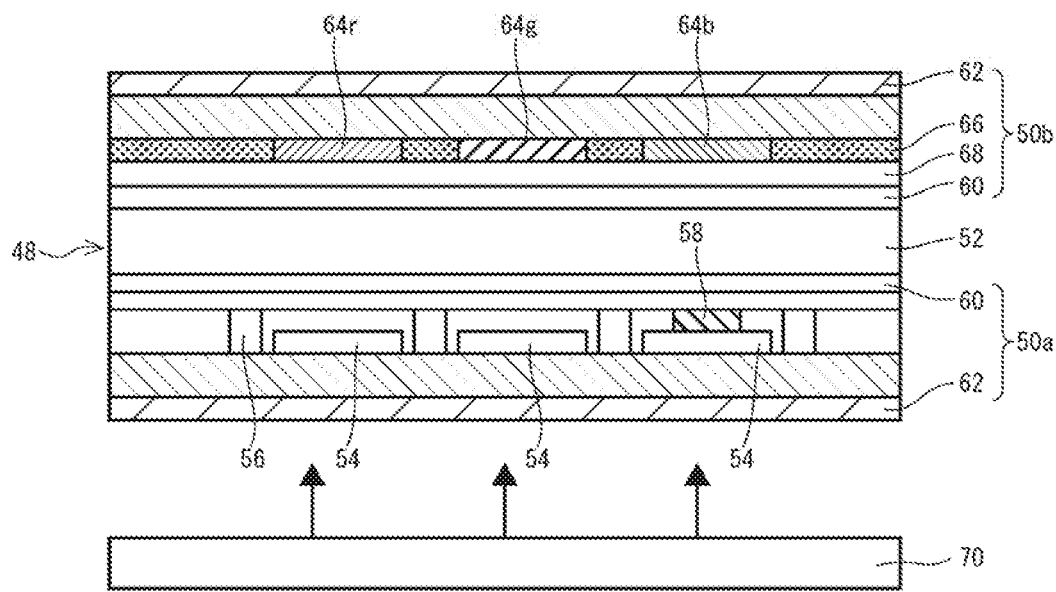
FIG. 5 is an illustration schematically showing a cross-sectional structure of a pixel of a display panel provided in the image forming apparatus of FIG. 1.

FIG. 5 is an illustration schematically showing a cross-sectional structure of a pixel of the display panel 48 provided in the image forming apparatus 10 of FIG. 1.

As shown in FIG. 5, the pixel included in the display panel 48 includes an active matrix substrate 50*a* arranged on a back surface side, a counter substrate 50*b* arranged on a front surface side, and a liquid crystal layer (liquid crystal shutter) 52. The active matrix substrate 50*a* is provided with a pixel electrode 54, a data signal line 56, the optical sensor 58, an alignment film 60, a polarizer 62, and the like. The counter substrate 50*b* is provided with color filters 64*r* (red), 64*g* (green), and 64*b* (blue), a light-shielding film 66, a counter electrode 68, an alignment film 60, a polarizer 62, and the like. The liquid crystal shutter 52 is provided between the active matrix substrate 50*a* and the counter substrate 50*b*. Also, on the back surface side of the display panel 48, a backlight (light-emitting portion) 70 is provided. In the pixel as described above, lighting and extinction of the light are controlled by opening and closing of the liquid crystal shutter 52 while the backlight 70 is being lit.

In the display panel 48 having such a configuration, when a document (the original) is placed on the polarizer 62 of the active matrix substrate 50*a* (a display area of the display panel 48), light is emitted from the backlight 70. The light from the backlight 70 is reflected by the document on the polarizer 62, and as the reflected light passes through the color filters 64*r*, 64*g* and 64*b*, and is detected by the optical sensor 58, an image of the document is read.

However, in the display panel 48, whether or not the document exists (i.e., whether or not the document is placed) on the polarizer 62 is detected before performing copying or reading (which may be referred to as "main scan" to distinguish such reading from determination of the document size) of the document. When it is detected that the document exists on the polarizer 62, an area in which the document exists on the polarizer 62 (hereinafter referred to as a "document area") is detected. Then, after the document area has been detected, the document is main-scanned.

A method of detecting presence of a document on the polarizer 62 will be explained. For example, one method is to detect presence or absence of the document according to whether the reflected light is received by the optical sensor 58 of each of the pixels by setting a part of the pixels of the display panel 48 to a lighting and imaging state (hereinafter referred to as an "active state") at regular time intervals. By this method, an area where an object that reflects light being existent on the polarizer 62 is detected, according to a position of the pixel that received the reflected light. Further, the nature of the object is determined by the size of an area in which the detected object exists. In the first embodiment, whether the object corresponds to a document, or whether the object corresponds to a finger of the user (including a pointing device such as a touch pen), etc., is determined. Here, when the size of an area in which the object exists is greater than or equal to a predetermined size, the target is determined as being a document. In contrast, when the size of an area in which the object exists is less than the predetermined size, the target is determined as being a finger or the like of the user. However, the above method is merely an example, and a method of detecting presence of a document on the polarizer 62 is not particularly limited.

Next, a method of detecting the document area will be explained. For example, one method is to set all of the pixels of the display panel 48 to the active state all together and determine whether the reflected light is received by the optical sensors 58 of the respective pixels, thereby detecting the document area from the positions (coordinate data) of the pixels that received the reflected light.

Alternatively, as another method of detecting the document area, a method of detecting the document area by setting a part of the pixels of the display panel 48 to the active state, and specifying the position of an edge of the document from the positions of the pixels that received the reflected light may be adopted.

Further, yet another method is to set a plurality of pixels from among all of the pixels of the display panel 48 to the active state sequentially to form a random configuration, and determine whether the reflected light is received at positions corresponding to all of the pixels, thereby detecting the document area from the positions of the pixels that received the reflected light.

Note that the methods described above are merely examples, and a method of detecting the document area is not particularly limited.

Next, a method of detecting a position where the user has touched the polarizer 62 with a fingertip or the like will be described.

Figure 6A:
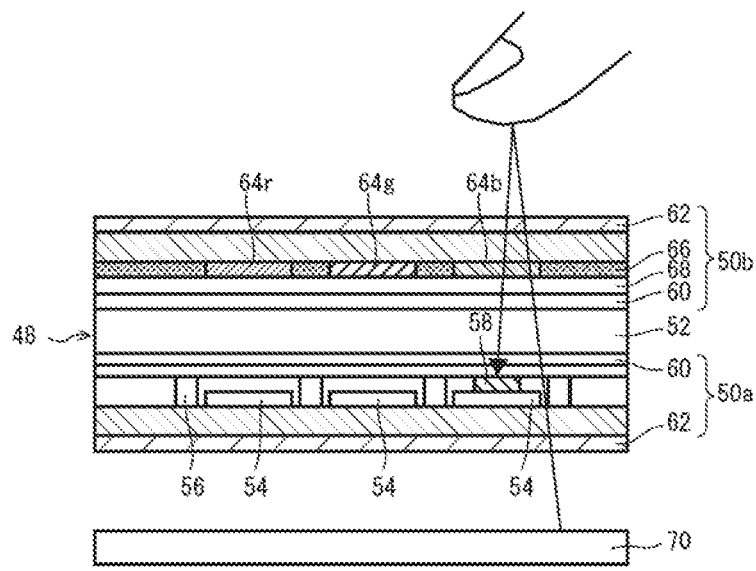
FIG. 6A is an illustration showing a method of detecting a touch position by a reflected image.
Figure 6B:
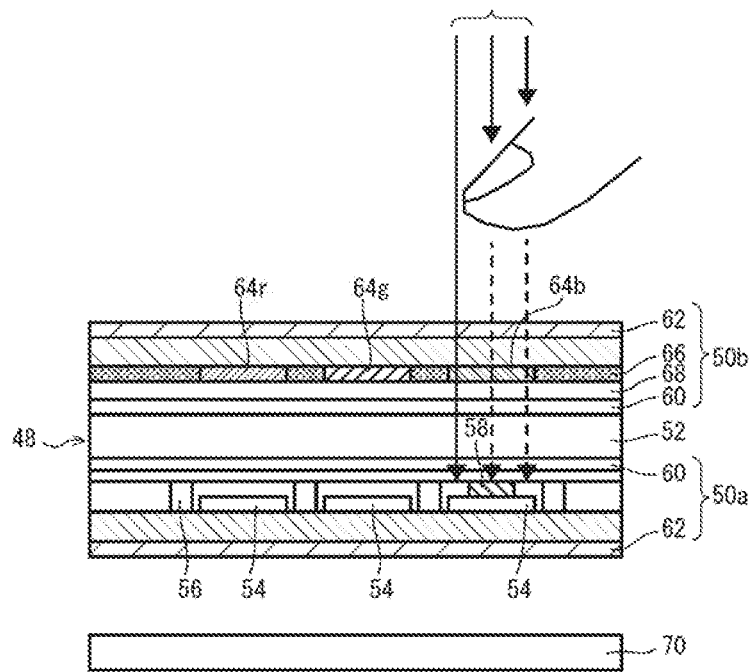
FIG. 6B is a illustration showing method of detecting a touch position by a shadow image.

FIG. 6A is an illustration showing a method of detecting a touch position by a reflected image. FIG. 6B is an illustration showing a method of detecting a touch position by a shadow image.

For example, the display panel 48 as described above can detect a position where the user has touched (i.e., a touch position) by detecting a reflected image of the user's fingertip or the like by the optical sensor 58. Specifically, as shown in FIG. 6A, light emitted from the backlight 70 is reflected by an object such as the user's finger or the like. The light reflected by the object, in other words, the reflected light, is made incident on the optical sensor 58. At this time, the level of a sensor output signal output from the optical sensor 58 fluctuates. In a case where the level of the sensor output signal is greater than or equal to a predetermined value (threshold value), it is detected that an object exists. Further, the touch position is detected according to the position of the pixel at which the object is detected.

Furthermore, the display panel 48 can detect a position where the user has touched by detecting a shadow image by the optical sensor 58. The optical sensor 58 included in the display panel 48 can also detect external light transmitted through the counter substrate 50*b* or the like. As shown in FIG. 6B, when there is an object such as the user's finger, incidence of the external light is prevented, and the amount of external light incident on the optical sensor 58 is reduced. As a result, since the level of the sensor output signal output from the optical sensor 58 fluctuates, it is determined that an object exists.

As described above, in detecting a position where the user has touched, reflected light (a reflected image) of the light emitted from the backlight 70 may be used, or a shadow image produced by the external light may be used. Also, the above two types of detection methods may be used in combination to detect a position where the user has touched by using both of the shadow image and the reflected image.

Figure 7:
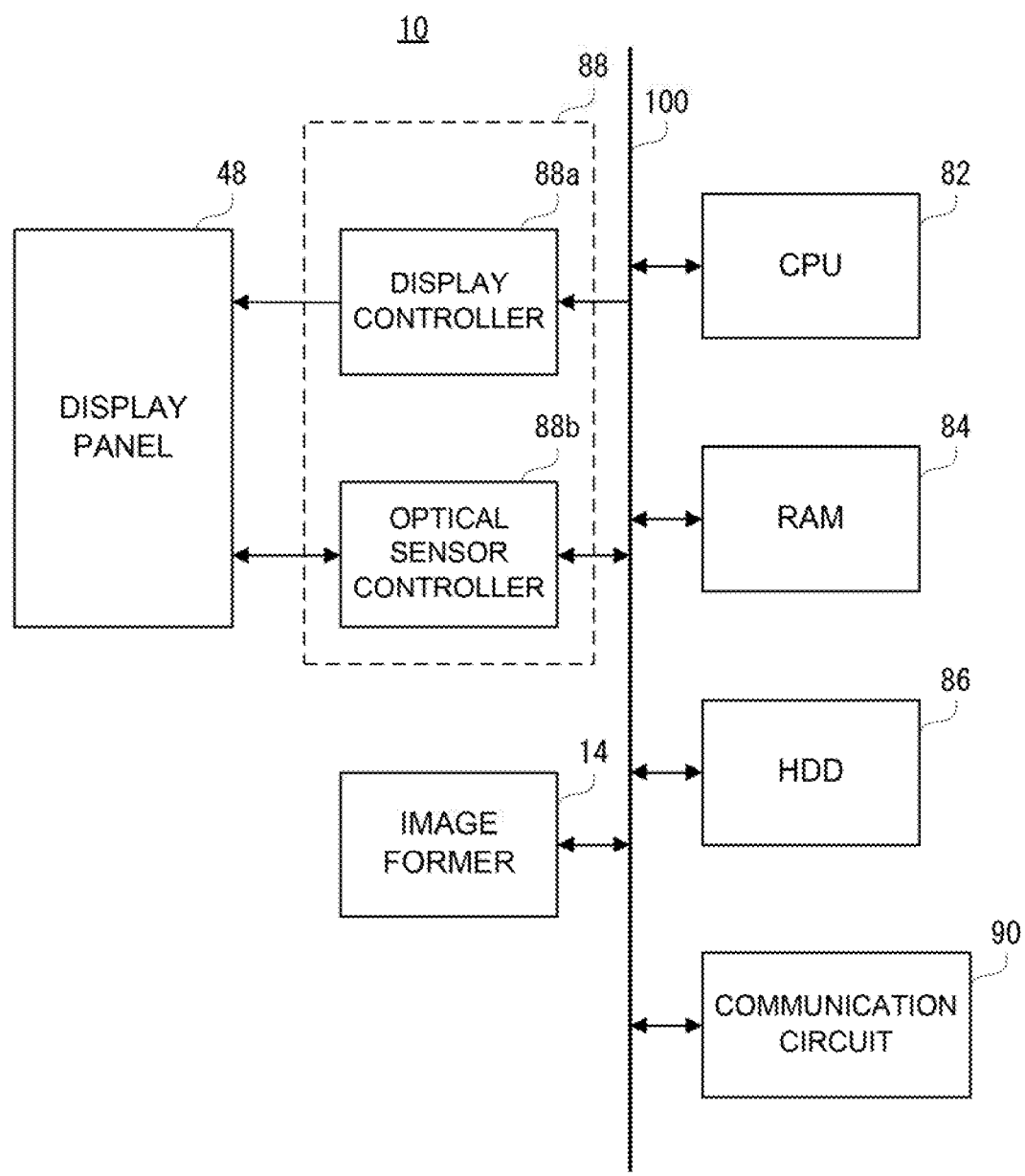
FIG. 7 is a block diagram showing the electrical configuration of the image forming apparatus shown in FIG. 1.

FIG. 7 is a block diagram showing the electrical configuration of the image forming apparatus 10 shown in FIG. 1. Referring to FIG. 7, the image forming apparatus 10 includes a CPU 82. A RAM 84, an HDD 86, a display panel control circuit 88, a communication circuit 90, and the image former 14 are connected to the CPU 82 via a bus 100. Also, the display panel 48 is connected to the display panel control circuit 88.

The CPU 82 manages overall control of the image forming apparatus 10. The RAM 84 is used as a work area and a buffer area of the CPU 82.

The HDD 86 is a main storage device of the image forming apparatus 10, and stores, as appropriate, a control program for the CPU 82 to control the operation of each part of the image forming apparatus 10, and data or the like. Also, the HDD 86 stores print image data transmitted from an external computer. Alternatively, instead of the HDD 86 or together with the HDD 86, another non-volatile memory such as a flash memory may be provided.

The display panel control circuit 88 includes a display controller 88a and an optical sensor controller 88b. The display controller 88a includes a GPU, a VRAM, and the like. Under the instruction of the CPU 82, the GPU generates, in the VRAM, display image data for displaying various screens on the display panel 48 by using image generation data 304e stored in the RAM 84. Further, the GPU outputs the generated display data to the display panel 48. Further, under the instruction of the CPU 82, the display controller 88a controls lighting and extinction of light of the backlight 70, and also opening and closing of the liquid crystal shutter 52 of each of the pixels.

The optical sensor controller 88b transmits, under the instruction of the CPU 82, a timing control signal to an optical sensor drive circuit (not shown) of the optical sensor 58, in order to have detection of the reflected light executed. Also, the optical sensor controller 88b controls reading of a detection signal of the optical sensor 58 under the instruction of the CPU 82.

Further, the optical sensor controller 88b controls reading of the sensor output signal output from the optical sensor 58. When the amount of light received by the optical sensor 58 is changed, the CPU 82 determines whether a document is placed or the display panel 48 is touched, on the basis of the sensor output signal acquired from the optical sensor controller 88b. When the document is placed, the CPU 82 generates image data on the basis of the sensor output signal. In other words, the image data read by the display panel 48 is generated. On the other hand, when the display panel 48 is touched, the CPU 82 generates coordinate data indicating a position on the display panel 48 according to the coordinates of the pixel at which the reflected image or shadow image of the object is detected. That is, touch coordinate data corresponding to the position where the user has touched the display panel 48 is generated.

The communication circuit 90 is a communication circuit for establishing connection to a network such as a LAN or the Internet. The communication circuit 90 is a wired communication circuit or a wireless communication circuit, and the communication circuit 90 communicates with an external computer via the network, in accordance with an instruction from the CPU 82. Alternatively, the communication circuit 90 can directly communicate with the external computer by short-range wireless communication or the like without intermediation of the network.

Note that the electrical configuration of the image forming apparatus 10 shown in FIG. 7 is merely an example, and need not be limited to the illustrated configuration.

Figure 8:
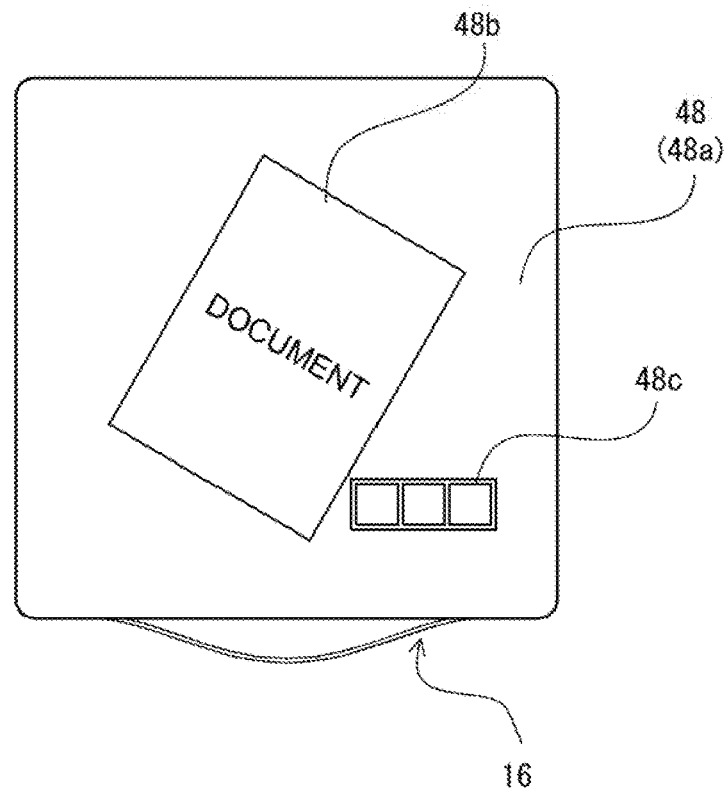
FIG. 8 is an illustration showing a display panel with a document being placed thereon according to the first embodiment.
Figure 9:
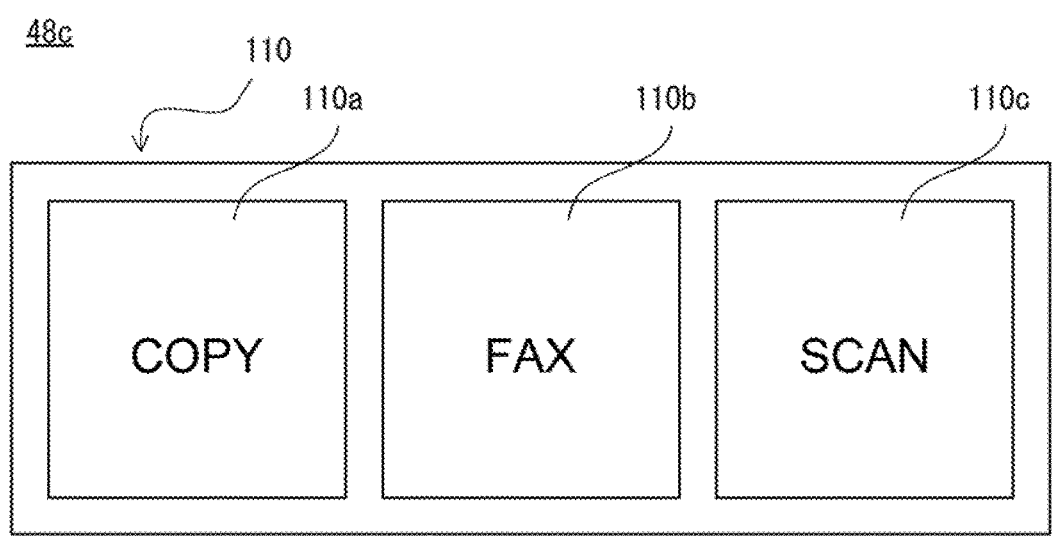
FIG. 9 is an illustration showing one example of a home screen included in an operation portion of the first embodiment.

FIG. 8 is an illustration showing the display panel 48 with a document being placed thereon according to the first embodiment. FIG. 9 is an illustration showing one example of a home screen 110 included in an operation portion 48c of the first embodiment.

The display panel 48 of the first embodiment includes an image display function (display portion) 48a, an image reading function (image reader) 48b, and a touch detection function (operation portion) 48c.

As shown in FIG. 8, when the display panel 48 functions as the display portion 48a, the entire, display area of the display panel 48 is used as the display portion 48a. In this case, on the display panel 48, various images including the status of the image forming apparatus 10 or/and various messages, an image scanned by the image reader 48b, and a preview image such as an image received (acquired) from an external computer, etc., are displayed. In a case where the display panel 48 functions as the display portion 48a, on the display panel 48, an assistive image including information for assisting the user's operation on the operation portion 48c may be displayed.

In a case where the display panel 48 functions as the image reader 48b, a part of or the whole of the display area of the display panel 48 is used as the image reader 48b. In this case, by the method as described above, each part of the display panel 48 is controlled. That is, whether a document has been placed may be detected, a document area may be detected, or the document may be main-scanned. However, in a case where the document is to be main-scanned, an area corresponding to the document area on the display panel 48 is used as the image reader 48b. That is, in the main scan, only the pixels corresponding to the document area are set to the active state.

When the display panel 48 functions as the operation portion 48c, a part of the display area of the display panel 48 is used as the operation portion 48c. However, the size (display size) of the operation portion 48c is set in advance. The operation portion 48c displays an operation screen including a software key (icon) and a message, etc., for receiving various settings or a print instruction, etc., from the user. As an example of the operation screen, on the operation portion 48c, the home screen 110 for selecting a desired job from among various jobs that can be executed by the image forming apparatus 10 is displayed. Here, in the first embodiment, the job means copying (including scanning of a document), printing (print), transmission of a facsimile, and the like.

As shown in FIGS. 8 and 9, the home screen 110 has a rectangular (oblong) shape, and is displayed (arranged) such that a right or left direction of the home screen 110 conforms to that of the image forming apparatus 10. The home screen 110 is provided with a plurality of icons. A predetermined function that can be executed by the image forming apparatus 10 is assigned to each of the plurality of icons. In the example shown in FIG. 9, on the home screen 110, a copy icon 112, a fax icon 114, and a scan icon 116 are provided in order from the left.

A function of executing a copy job is assigned to the copy icon 112. When the copy icon 112 is selected (touched) by the user, a copy mode for executing the copy job is set. Though not illustrated, when the copy mode is set, a copy setting screen is displayed on the operation portion 48c. The copy setting screen is a screen different from the home screen 110 described above, and is displayed in place of the home screen 110. On the copy setting screen, an icon or the like for changing various settings when a copy job is to be executed is provided.

A function of executing a fax job is assigned to the fax icon 114. Also, a function of executing a scan job is assigned to the scan icon 116. When the fax icon 114 is touched by the user, a fax mode for executing the fax job is set. Also, when the scan icon 116 is touched by the user, a scan mode for executing the scan job is set. Though not illustrated, when the fax mode is set, a facsimile setting screen is displayed on the operation portion 48c. Also, when the scan mode is set, a scan setting screen is displayed on the operation portion 48c.

The operation portion 48c is displayed on the display panel 48 when image display by the display panel 48 is started. Further, when the image display by the display panel 48 is ended, the operation portion 48c becomes invisible. However, when the image forming apparatus 10 is powered on or when the image forming apparatus 10 is recovered from the standby state (power-saving mode), for example, image display by the display panel 48 is started. Further, when the image forming apparatus 10 is powered off or when the image forming apparatus 10 is shifted to the power-saving mode, for example, the image display by the display panel 48 is ended.

In addition, when a document does not exist on the polarizer 62, the operation portion 48c is displayed at the basic position. Though not illustrated, the basic position is the front side on the right (i.e., the near side on the right as seen from the user). For example, the basic position is assumed as a position where an end portion of the operation portion 48c (an end portion of the home screen 110) is away from each of the right end portion and the front-side end portion of the display area of the display panel 48 by a predetermined distance (for example, 3 mm to 10 mm).

However, in a case where a document is placed on the polarizer 62 (i.e., a case where the document exists on the polarizer 62), the operation portion 48c is displayed at a position according to the document area on the display panel 48. More specifically, the operation portion 48c is displayed at a position according to the position of the document placed on the polarizer 62. When the document area is detected, the display position of the operation portion 48c is set according to the document area. The operation portion 48c is moved to the set display position.

Specifically, the position of the operation portion 48c in the right or left direction is set according to the position of the document area in the right or left direction. Also, the position of the operation portion 48c in the front-back direction is set according to the position of the document area in the front-back direction.

For example, the operation portion 48c is displayed (arranged) at an inner side relative to the widths of the document area in the front-back direction. That is, the operation portion 48c is displayed on the right side or the left side of the document area. The above can be rephrased as the operation portion 48c being displayed such that the operation portion 48c and the document area overlap each other in the front-back direction when viewed from the right or left direction of the image forming apparatus 10. In the example shown in FIG. 8, the operation portion 48c is displayed on the right side of the document area.

Also, the operation portion 48c is displayed near the document area in the right or left direction. However, the operation portion 48c being displayed near the document area can be rephrased as the operation portion 48c being displayed at a position along the document area. In addition, the operation portion 48c is displayed at a position closer to the document area than the end portion of the display area of the display panel 48.

Specifically, the operation portion 48c is displayed at a position where a distance between the document area and a part of the operation portion 48c (a part closest to the document area) falls within a predetermined distance (for example, 5 to 10 mm). However, the distance between the document area and the part of the operation portion 48c does not need to be particularly limited, and can be changed as appropriate.

Further, as shown in FIG. 8, when a side (an edge) extending in the vertical direction of the document area is inclined relative to the front-back direction of the image forming apparatus 10, the operation portion 48c is displayed such that at least a part of the operation portion 48c is located at an inner side relative to a width of the document area in the right or left direction. That is, the operation portion 48c is displayed such that at least a part of the operation portion 48c and the document area are aligned in the front back direction. The above can be rephrased as the operation portion 48c being displayed such that the operation portion 48c and the document area overlap each other in the right or left direction when viewed from the front of the image forming apparatus 10.

The operation as described above of the image forming apparatus 10 is realized as the CPU 82 executes a control program stored in the RAM 84. The specific processing will be described later with reference to a flowchart.

Figure 10:
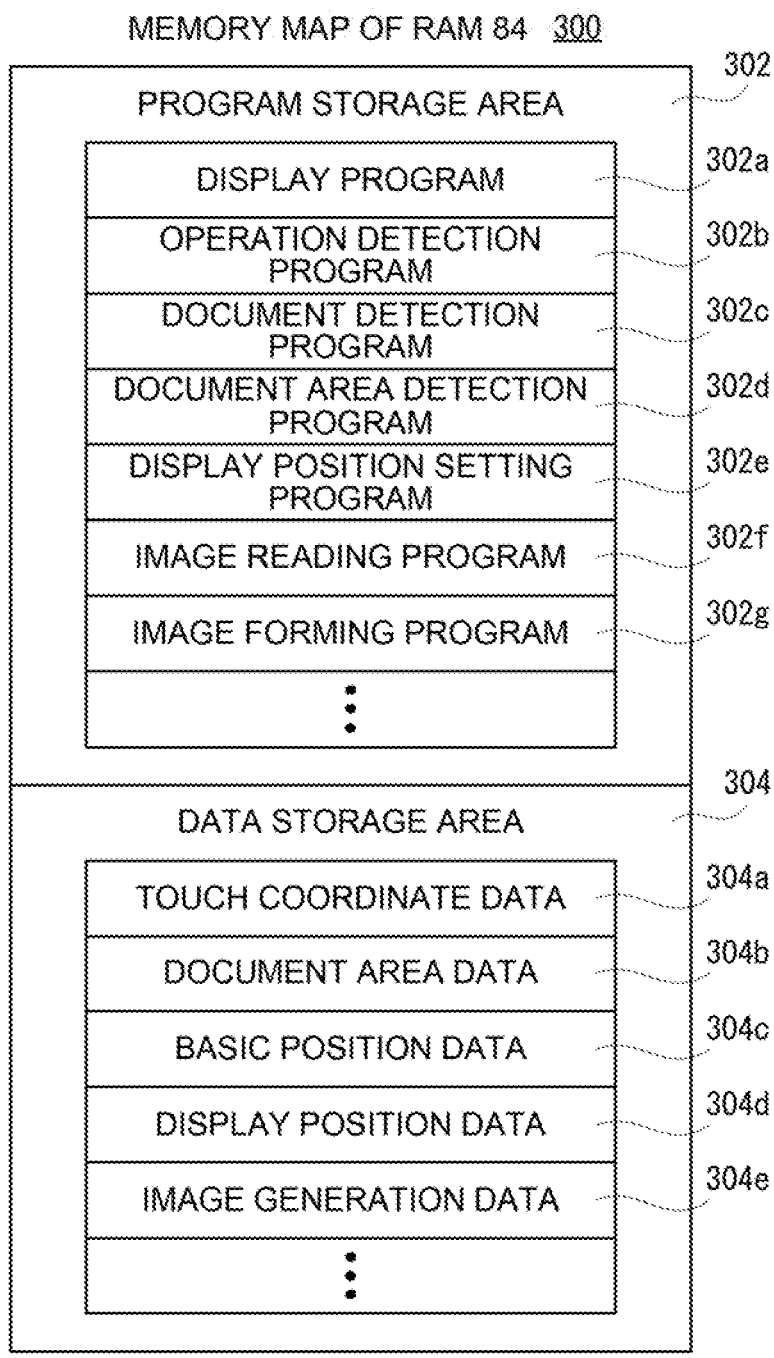
FIG. 10 is an illustration showing one example of a memory map of a RAM shown in FIG. 7.

FIG. 10 is an illustration showing one example of a memory map 300 of the RAM 84 shown in FIG. 7. As shown in FIG. 10, the RAM 84 includes a program storage area 302 and a data storage area 304. The program storage area 302 of the RAM 84 stores the control program of the image forming apparatus 10, as described above. The control program includes a display program 302a, an operation detection program 302b, a document detection program 302c, a document area detection program 302d, a display position setting program 302e, an image reading program 302f, and an image forming program 302g.

The display program 302a is a program for displaying various screens including a preview image and the like on the display panel 48 by controlling the display controller 88a. Also, the display program 302a is a program for displaying the operation portion 48c including the operation screen such as the home screen 110 on the display panel 48 by controlling the display controller 88a.

The operation detection program 302b is a program for detecting a touch operation on the display panel 48 by acquiring a detection signal of the optical sensor 58. For example, the operation detection program 302b is a program for detecting operation performed on various icons, which are included in the operation screen displayed on the operation portion 48c of the display panel 48, by acquiring touch coordinate data output from the optical sensor controller 88b.

The document detection program 302c is a program for detecting placement of a document on the polarizer 62 by acquiring a detection signal of the optical sensor 58.

The document area detection program 302d is a program for detecting a document area by acquiring a detection signal of the optical sensor 58, in a case where placement of a document on the polarizer 62 is detected by the document detection program 302c.

The display position setting program 302e is a program for setting a display position of the operation portion 48c in accordance with document area data 304b which will be described later.

The image reading program 302f is a program for reading (main-scanning) the image of a document, and outputting an image signal (image data) corresponding to the read image.

The image forming program 302g is a program for controlling the image former 14, and printing an image or the like read from the document on a sheet.

Though not illustrated, the program storage area 302 also stores programs and the like for selecting and executing various functions.

The data storage area 304 of the RAM 84 stores touch coordinate data 304a, the document area data 304b, basic position data 304c, display position data 304d, the image generation data 304e, and the like.

The touch coordinate data 304a is touch coordinate data detected (acquired) in accordance with the operation detection program 302b. The detected touch coordinate data 304a is stored in chronological order.

The document area data 304b is data on a document area where the document exists, which is detected according to the document area detection program 302d. Specifically, the document area data 304b is a set of coordinate data of pixels whereby the presence of a document is determined.

The basic position data 304c is a set of coordinate data indicating the display position of the operation portion 48c in a case where there is no document on the polarizer 62.

The display position data 304d is data on a display position of the operation portion 48c set according to the display position setting program 302e. Specifically, the display position data 304d is, the display position data 304d is coordinate data corresponding to the center point of an area where the operation portion 48c is to be displayed or coordinate data corresponding to a centroid point of an area where the operation portion 48c is to be displayed. Also, the display position data 304d may be a set of coordinate data corresponding to an area where the operation portion 48c is to be displayed.

The image generation data 304e is data, such as polygon data or texture data for generating the display image data corresponding to various screens, to be displayed on the display panel 48 (display portion 48a). Further, the image generation data 304e includes operation screen data corresponding to the operation portion 48c. Here, the operation screen data is data corresponding to the operation screen such as the home screen 110.

Though not illustrated, in the data storage area 304, image data read from the document by the image reader 48b or image data input from an external computer may be stored, the other data necessary for executing the control program may be stored, or a register necessary for executing the control program may be provided.

Figure 11:
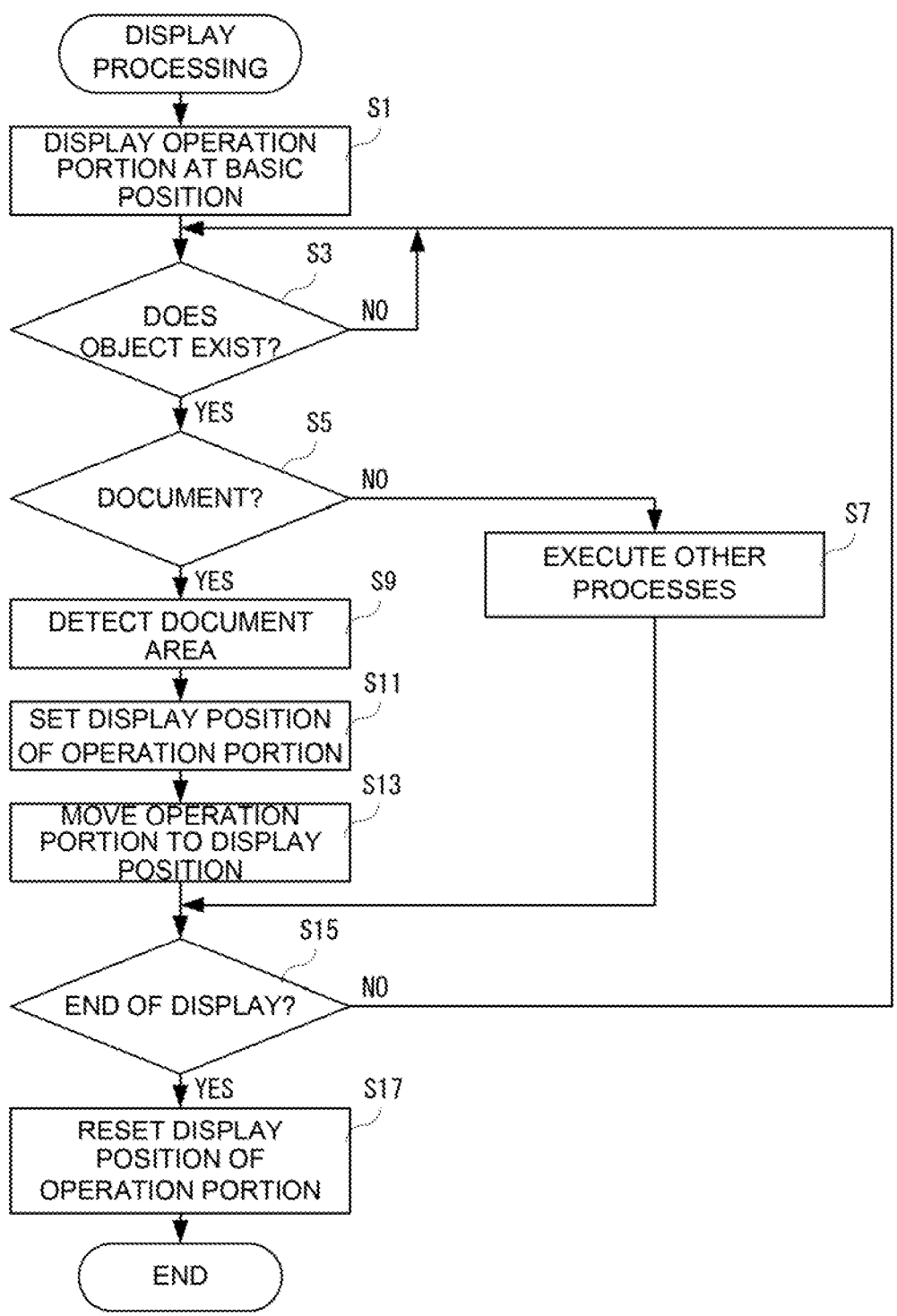
FIG. 11 is a flowchart showing one example of display processing of the image forming apparatus shown in FIG. 1.

FIG. 11 is a flowchart showing one example of display processing of the image forming apparatus 10 shown in FIG. 1. The display processing is started when the image forming apparatus 10 is powered on or is recovered from the power-saving mode. As shown in FIG. 11, when the display processing is started, the CPU 82 displays the operation portion 48c at the basic position in step S1, and determines, in step S3, whether an object exists on the display panel 48. Here, it is determined whether or not the amount of light received by the optical sensor 58 of the pixel included in the display panel 48 has changed.

If step S3 is "NO", in other words, if no object exists on the display panel 48, the process returns to step S3. On the other hand, if step S3 is "YES", in other words, if an object exists on the display panel 48, it is determined in step S5 whether the object existing on the display panel 48 is a document.

If step S5 is "NO", in other words, if the object existing on the display panel 48 is not a document (for example, the display panel 48 is touched), the other processes are executed in step S7, and the process proceeds to step S15. As the other processes are executed in step S7, a process of selecting each job according to the user's instruction, a process of making various settings in each job, and a process of starting or stopping each job are applicable.

On the other hand, if step S5 is "YES", in other words, if the object existing on the display panel 48 is a document, the document area is detected in step S9, a display position of the operation portion 48c is set in step S11, and the operation portion 48c is moved to the display position in step S13.

Next, in step S15, whether to end the image display by the display panel 48 is determined.

If step S15 is "NO", in other words, if the image display by the display panel 48 is not to be ended, the process returns to step S3. On the other hand, if step S15 is "YES", in other words, if the image display by the display panel 48 is to be ended, the display position of the operation portion 48c is reset in step S17, and the display processing is ended. Here, the display position of the operation portion 48c being reset means that the display position data 304d is to be erased.

According to the first embodiment, the display panel 48 serves as the display portion 48a which displays an image, the image reader 48b which reads a document placed on a display surface, and the operation portion 48c which receives an input operation by the user. Thus, it is possible to reduce the manufacturing cost, and achieve downsizing of the apparatus.

Further, according to the first embodiment, since the operation portion 48c is displayed at a position according to the document area, the user can place the document on the display panel 48 without restraint, which is convenient.

Furthermore, according to the first embodiment, since the operation portion 48c is displayed at a position along the document area, the user is enabled to easily recognize the operation portion, and also easily operate the operation portion.

In addition, according to the first embodiment, since the display panel 48 constitutes the top plate of the image forming apparatus 10, it is possible to make the display surface of the display panel 48 large in size. Accordingly, in a case where the display panel 48 serves as the display portion 48a, the user can easily visually recognize the display portion 48a.

Note that in the first embodiment, the operation portion 48c is made to be displayed at the inner side relative to the widths of the document area in the front-back direction. However, the position need not be limited to the above. For example, the operation portion 48c may be displayed at the outer side relative to the widths of the document area in the front-back direction. In this case, the operation portion 48c is displayed on the front side or the back side of the document area. If the operation portion 48c is made to be displayed on the front side of the document area, a distance between the user and the operation portion 48c is reduced, which leads to good operability on the operation portion 48c. If the operation portion 48c is made to be displayed on the back side of the document area, even in a case where there exists a sheet discharged to the sheet discharge portion 16, it is possible to prevent the sheet discharged to the sheet discharge portion 16 from obstructing the operation when the user operates the operation portion 48c.

In addition, in the first embodiment, the operation portion 48c is made to be displayed at a position away from the document area. However, the position need not be limited to the above. For example, the operation portion 48c may be displayed at such a position that an edge of the document area (edge of the document) comes into contact with an edge of the operation portion 48c. In this case, since the operation portion 48c is displayed adjacent to the document area, the user is enabled to easily recognize the operation portion 48c, and also easily operate the operation portion 46c.

Second Embodiment

An image forming apparatus 10 according to a second embodiment is the same as the image forming apparatus 10 according to the first embodiment except that the second embodiment has been structured to display an operation portion 48c at an off-document area outside a document area, in a case where the operation portion 48c and the document area overlap each other. Therefore, only the matters different from the first embodiment will be described, and duplicated explanation will not be provided.

Figure 12A:
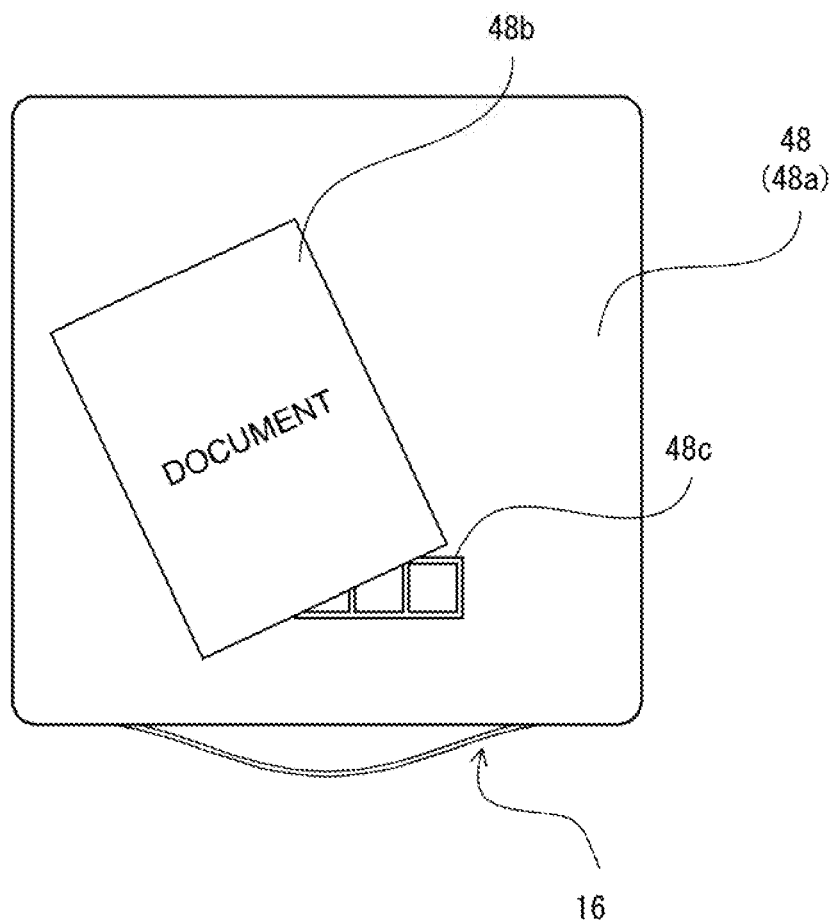
FIG. 12A is a plan view showing the case where the operation portion and a document area overlap each other.
Figure 12B:
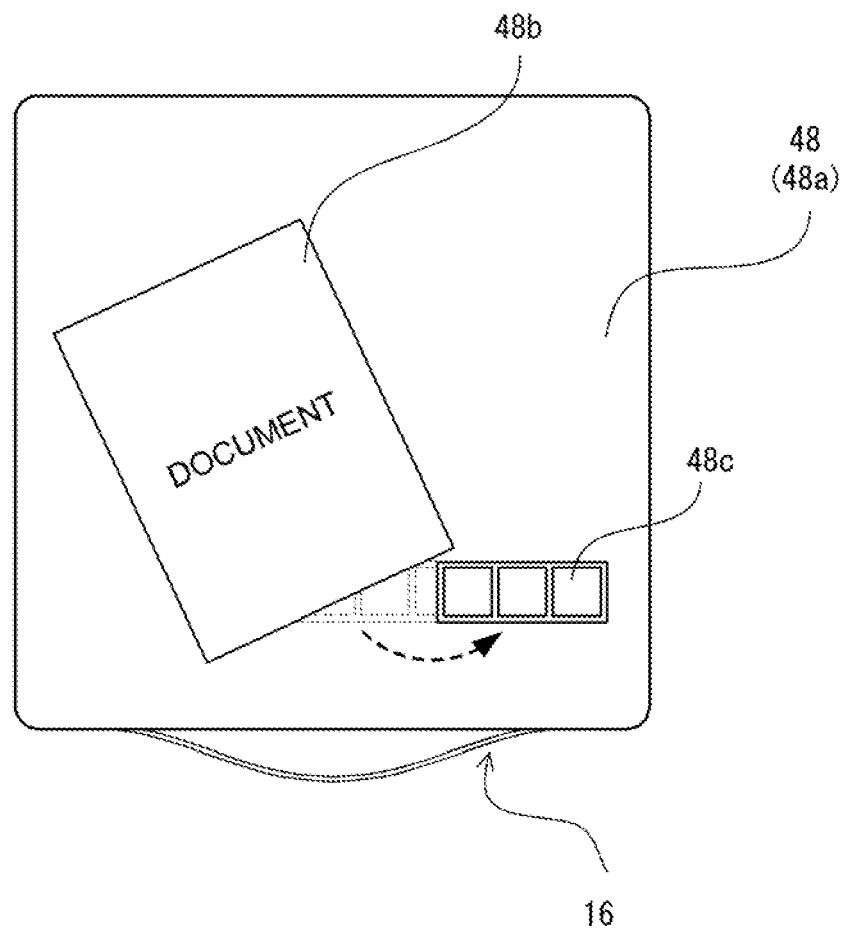
FIG. 12B is a plan view showing the case where the operation portion is moved.

FIG. 12A is a plan view showing the case where the operation portion 48c and the document area overlap each other. FIG. 12B is a plan view showing the case where the operation portion 48c is moved.

As shown in FIG. 12A, the operation portion 48c and the document area may overlap each other. For example, when there exist a plurality of documents, the next document may be placed to overlap the operation portion 46c displayed at a display position set according to the previous document. In this case, the operation portion 46c and the document area overlap each other. Also, when a document is placed in such a manner as to overlap the operation portion 48c displayed at the basic position, the operation portion 48c and the document area overlap each other.

As shown in FIG. 12B, in the second embodiment, when the operation portion 48c and the document area overlap each other, the operation portion 48c is moved to an off-document area outside the document area. However, the operation portion 48c being moved means that the display position of the operation portion 48c is newly set (changed), in place of the display position of the operation portion 48c when the operation portion 48c and the document area overlap each other. For example, the operation portion 48c may be moved only in the right or left direction, and not be moved in the front-back direction. In this case, the operation portion 48c is moved in a direction of the right or left with a less distance of travel to move to the off-document area from a position before the movement, in the example shown in FIG. 12B, the operation portion 48c is moved to the right.

Further, in a case where the operation portion 48c and the document area do not overlap each other, as has been described in the first embodiment, a display position of the operation portion 48c is set according to the document area. In this case, when a plurality of documents exist, if the document area does not overlap the operation portion 48c displayed at a display position set according to the previous document, the display position of the operation portion 48c may not be newly set.

Hereinafter, display processing of the image forming apparatus 10 of the second embodiment will be described by referring to a flowchart. The same reference symbols are assigned to processing that is the same as the display processing explained in the first embodiment, and explanation will be omitted or brief explanation is to be provided for duplicated matters.

Figure 13:
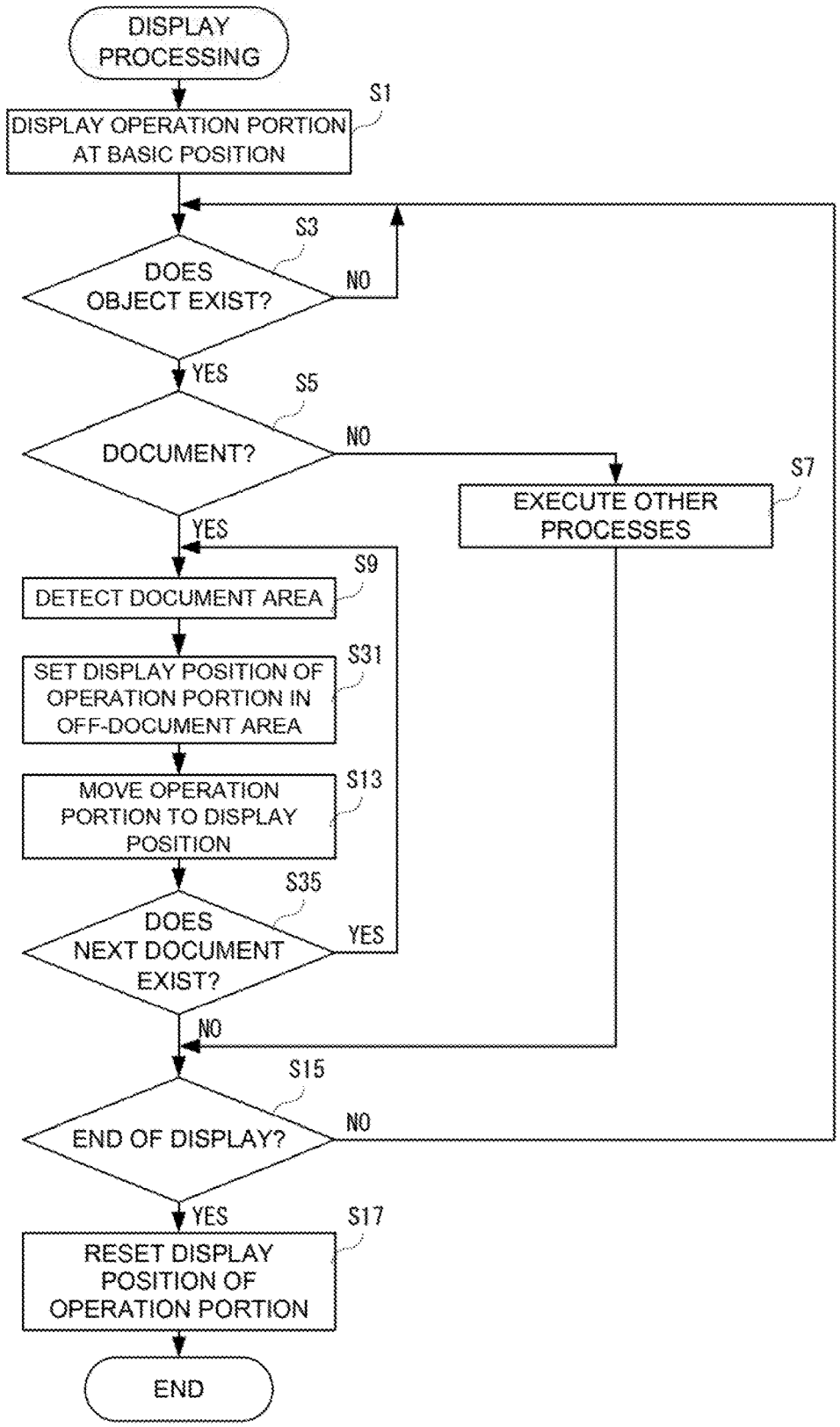
FIG. 13 is a flowchart showing one example of display processing according to a second embodiment.

FIG. 13 is a flowchart showing one example of the display processing according to the second embodiment. As shown in FIG. 13, when the display processing is started, a CPU 82 detects, in step S9, a document area, sets, in step S31, a display position of the operation portion 48c in the off-document area, and moves, in step S13, the operation portion 48c to the display position. However, in step S31, when the operation portion 48c and the document area do not overlap each other at the display position of the operation portion 48c already set, the display position of the operation portion 48c may not be newly set.

Next, in step S33, whether a next document exists is determined. Here, it is determined whether a document is detected again within a predetermined time after the document is no longer detected for the time being.

If step 333 is "YES", in other words, if there is a next document, the process returns to step S9. Meanwhile, if step S33 is "NO", in other words, if there is no next document, the process proceeds to step S15.

The details of the processing up to step S9 and the processing of step S15 and thereafter are the same as those of the first embodiment, and thus explanation of the same parts is omitted.

According to the second embodiment, since the operation portion 48c is to be displayed in the off-document area outside the document area, in a case where the operation portion 48c and the document area overlap each other, the operation portion 48c is moved to the off-document area outside the document area. Accordingly, even if a document is placed on the operation portion 48c, it is possible to prevent the operation portion 48c from being inoperable.

Further, according to the second embodiment, the operation portion 48c is moved only in the right or left direction, and is moved in a direction with a less distance of travel to move to the off-document area from a position before the movement. Accordingly, since the operation portion 48c is moved with regularity, the user can predict an area where the operation portion 48c is to be displayed, which is convenient.

Further, in the second embodiment, in a case where the operation portion 48c and the document area overlap each other, the operation portion 48c is moved so that the operation portion 48c is displayed in the off-document area. However, the way in which the operation portion 48c is displayed need not be limited to the above. For example, when the operation portion 48c and the document area overlap each other, in addition to moving the operation portion 48c, or instead of moving the operation portion 48c, the direction defining the longitudinal direction of the operation portion 48c may be changed (rotated). In this case, the operation portion 48c may be rotated by 90 degrees counterclockwise or clockwise, or may be rotated by such an angle that the orientation of an edge of the operation portion 48c conforms to the orientation of an edge of the document area (edge of the document). Further, in a case where the direction defining the longitudinal direction of the operation portion 48c is to be changed, the orientation of an operation screen included in the operation portion 48c may be changed, or the arrangement of icons included in the operation screen may be changed. For example, when the icons included in the operation screen before the direction defining the longitudinal direction of the operation portion 48c is changed are arranged in the right or left direction (lateral direction), the arrangement of the icons is changed such that the icons included in the operation screen are arranged in the front-back direction (longitudinal direction).

Also, in the second embodiment, in a case where the operation portion 48c and the document area overlap each other, the operation portion 48c is moved so that the operation portion 48c is displayed in the off-document area. However, the way in which the operation portion 48c is displayed need not be limited to the above. For example, when the operation portion 48c overlaps various images such as an image including the status of the image forming apparatus 10 or/and various messages, and a preview image that are displayed on the display panel 48, the operation portion 48c may be moved so that the operation portion 48c can be displayed in an area other than the area in which the various images are displayed.

Further, in the second embodiment, the operation portion 48c is made to move only in the right or left direction. However, the direction of movement need not be limited to the above. For example, the operation portion 48c may be moved only in the front-back direction. In this case, the operation portion 48c is moved in a direction of the front side or the back side with a less distance of travel to move to the off-document area from a position before the movement. By such a structure, since the operation portion 48c is moved with regularity, the user can predict an area where the operation portion 48c is to be displayed, which is convenient.

Also, the operation portion 48c may be moved in the front, back, right, and left directions. In this case, the operation portion 48c is moved such that a distance of travel to move to the off-document area from a position before the movement becomes the shortest distance. By such a structure, since the operation portion 48c is moved to a near position, the user can predict an area where the operation portion 48c is to be displayed, which is convenient.

Third Embodiment

An image forming apparatus 10 according to a third embodiment is the same as the image forming apparatus 10 according to the first embodiment except that the third embodiment has been structured to change the display size of an operation portion 48c according to the document area. Therefore, only the matters different from the first embodiment will be described, and duplicated explanation will not be provided.

In the image forming apparatus 10 of the third embodiment, the display size of the operation portion 48c is increased or reduced according to the document area.

Figure 14A:
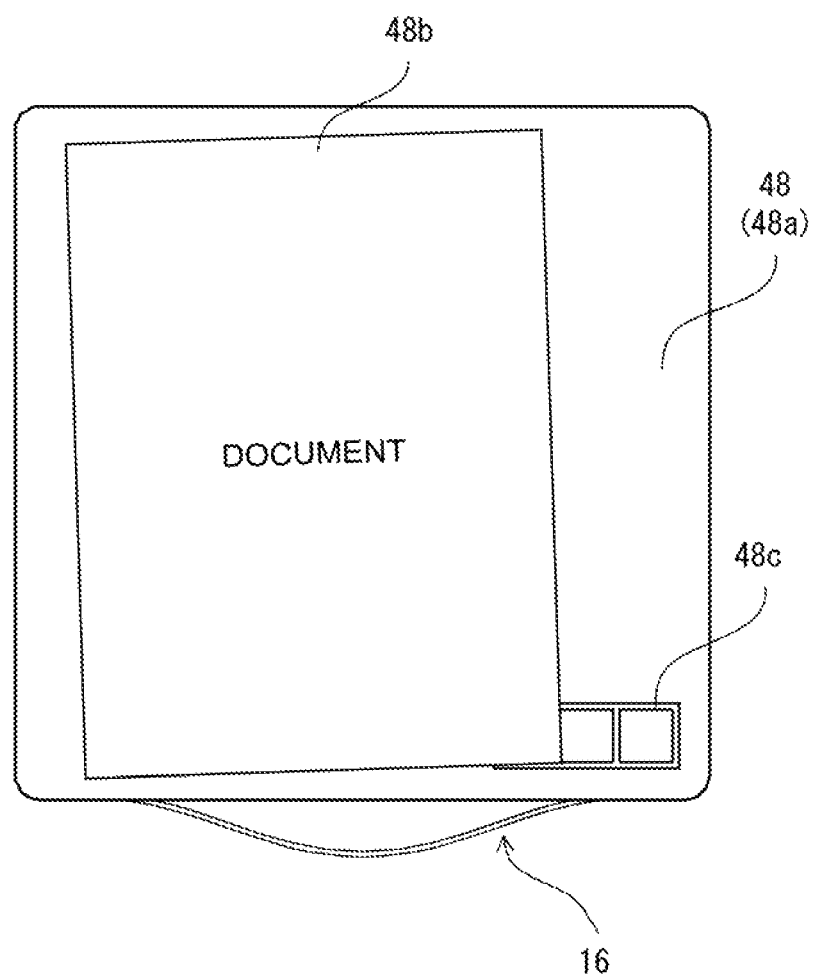
FIG. 14A is a plan view showing the case where the ratio of the document area to the display panel is large.
Figure 14B:
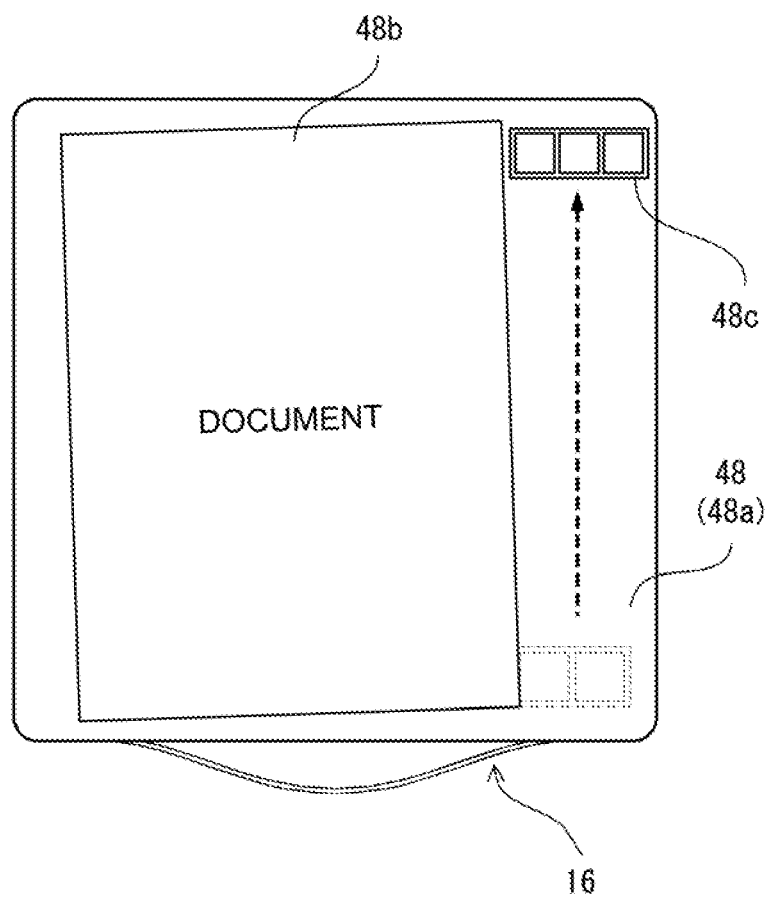
FIG. 14B is a plan view showing the case where the operation portion is moved while reducing the display size of the same.

FIG. 14A is a plan view showing the case where the ratio of a document area to a display panel 48 is large. FIG. 14B is a plan view showing the case where the operation portion 48c is moved while reducing the display size of the same.

As shown in FIG. 14A, when the ratio of the document area to the display panel 48 is large, there may not be an area sufficient for displaying the operation portion 48c of the initial setting size. In other words, there may not be a space for displaying the operation portion 48c in an off-document area outside the document area. In this case, even if the operation portion 48c is moved, the operation portion 48c and the document area overlap each other. That is, it is impossible to display the whole of the operation portion 48c.

In the third embodiment, when it is determined that the whole of the operation portion 48c cannot be displayed, the display size of the operation portion 48c is reduced, as shown in FIG. 14B. Further, not only is the display size reduced, but the operation portion 48c is also moved to a position where the operation portion 48c can be displayed at the maximum size in the off-document area. That is, the display size of the operation portion 48c is set to a displayable size when the operation portion 48c is moved. For example, in the example shown in FIG. 14B, on the right side of a display area of the display panel 48, an area for displaying the operation portion 48c on the back side is greater than that on the front side. For this reason, the operation portion 48c is moved to the back side, and is also reduced to a displayable size when the operation portion 48c is moved to the back side.

Further, though not illustrated, when the ratio of the document area to the display panel 48 is small, the display size of the operation portion 48c may be increased. For example, when the operation portion 48c is to be displayed at the basic position, the operation portion 48c may be increased to the maximum displayable size at the basic position. Also, when the operation portion 48c is moved from the basic position, the operation portion 48c may be moved to a position where the operation portion 48c can be displayed at the maximum size, and increased to a size that can be displayed at that position.

Hereinafter, display processing of the image forming apparatus 10 of the third embodiment will be described by referring to a flowchart. The same reference symbols are assigned to processing that is the same as the display processing explained in the first embodiment, and explanation will be omitted or brief explanation is to be provided for duplicated matters.

Figure 15:
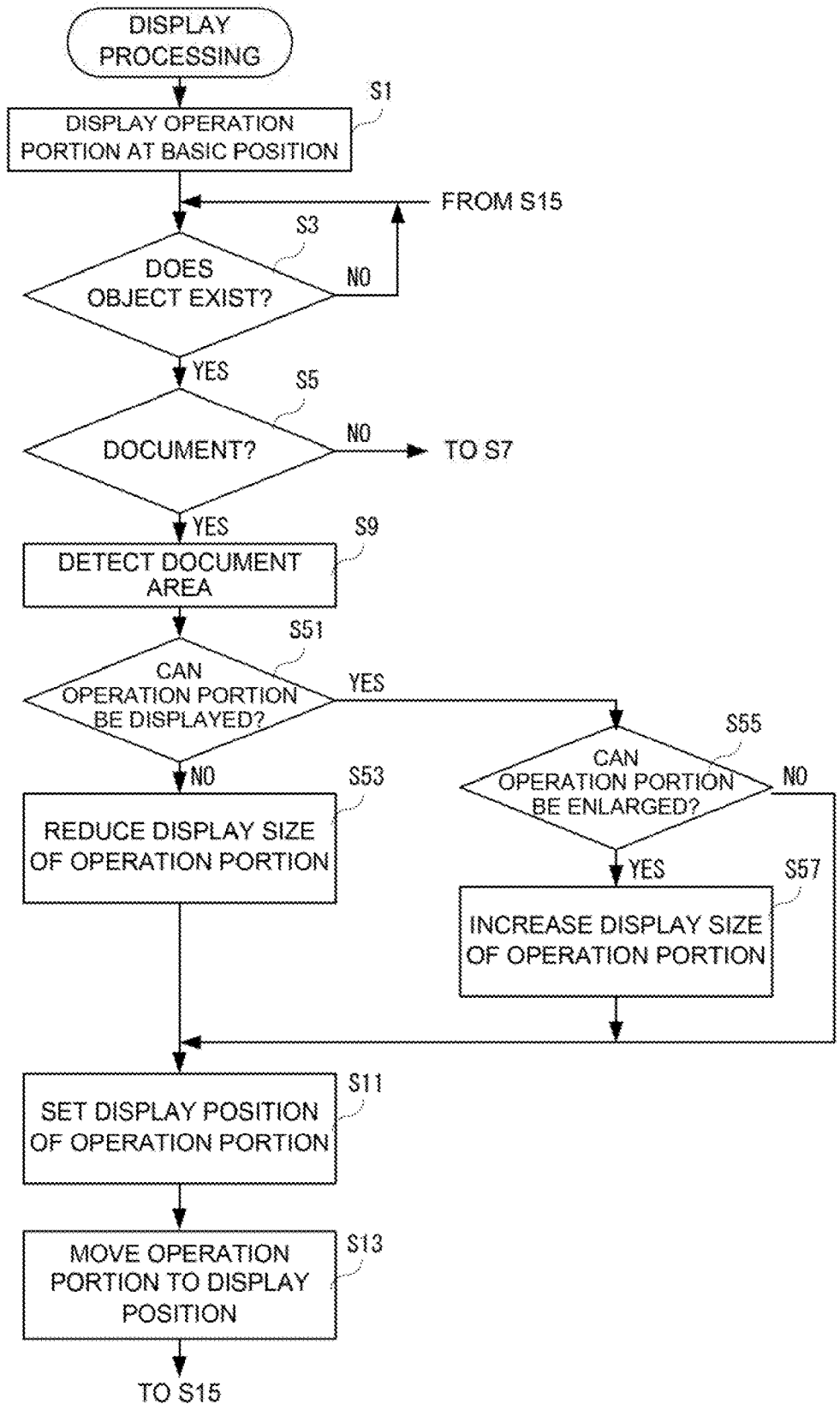
FIG. 15 is a flowchart showing one example of display processing according to a third embodiment.

FIG. 15 is a flowchart showing one example of the display processing according to the third embodiment. As shown in FIG. 15, when the display processing is started, a CPU 82 detects, in step S9, a document area, and determines, in step S51, whether the whole of the operation portion 48c can be displayed. Here, it is determined whether there exists an area for displaying the operation portion 46c of the initial setting size by using operation screen data corresponding to the operation portion 48c included in image generation data 304e, and document area data 304b.

If step S51 is "NO", in other words, if the whole of the operation portion 48c cannot be displayed, the display size of the operation portion 48c is reduced (i.e., the display magnification of the operation portion 48c is changed) in step S53, and the process proceeds to step S11.

Meanwhile, if step S51 is "YES", in other words, if the whole of the operation portion 48c can be displayed, it is determined, in step S55, whether the operation portion 48c can be displayed in an enlarged scale.

If step S55 is "YES", in other words, if the operation portion 48c can be displayed in an enlarged scale, the display size of the operation portion 48c is increased (i.e., the display magnification of the operation portion 48c is changed) in step S57, and the process proceeds to step S11. Meanwhile, if step S55 is "NO", in other words, if the operation portion 48c cannot be displayed in an enlarged scale, the process proceeds to step S11 by skipping step S57.

The details of the processing up to step S9 and the processing of step S11 and thereafter are the same as those of the first embodiment, and thus explanation of the same parts is omitted.

According to the third embodiment, when there is an area sufficient for displaying the operation portion 48c of the initial setting size, the display size of the operation portion 48c is increased. Consequently, it becomes easy for the user to recognize the operation portion 48c.

Also, according to the third embodiment, when there does not exist an area sufficient for displaying the operation portion 48c of the initial setting size, the display size of the operation portion 48c is reduced. Consequently, it is possible to prevent the operation portion 48c from being inoperable.

Fourth Embodiment

An image forming apparatus 10 according to a fourth embodiment is the same as the image forming apparatus 10 according to the first embodiment except that the fourth embodiment has been structured to set an area in which an operation portion 48c is preferentially displayed. Therefore, only the matters different from the first embodiment will be described, and duplicated explanation will not be provided.

Figure 16:
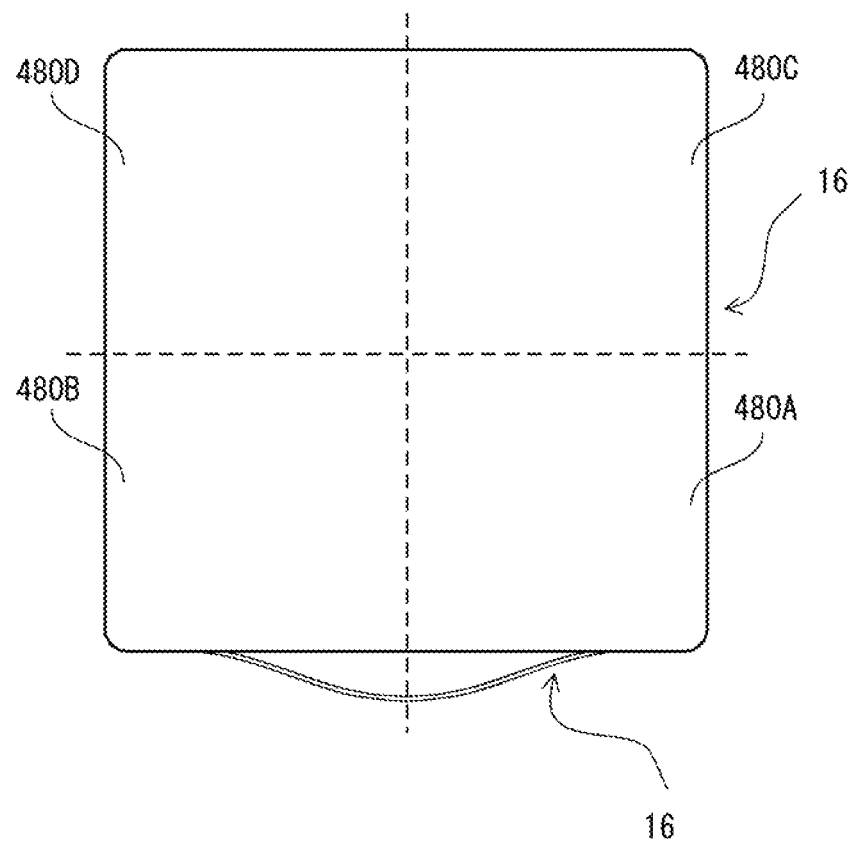
FIG. 16 is a plan view showing divided areas in a fourth embodiment.

FIG. 16 is a plan view showing divided areas 480 in the fourth embodiment. In the fourth embodiment, a display area of a display panel 48 includes a plurality of divided areas 480. For example, as shown in FIG. 16, the display area of the display panel 48 includes four divided areas 480A to 480D divided by the middle in the right or left direction and the middle in the front-back direction. The divided area 480A is the right front side area. The divided area 480B is the left front side area. The divided area 480C is the right back side area. The divided area 480D is the left back side area.

For each of the divided areas 480A to 480D, the order of priority for displaying the operation portion 48c is set. For example, the setting is made such that the order of priority of the front side areas becomes higher than that of the back side areas. Also, the setting is made such that the order of priority of the right areas becomes higher than that of the left areas. Accordingly, the divided area 480A is set to the first priority, the divided area 480B is set to the second priority, the divided area 480C is set to the third priority, and the divided area 480D is set to the fourth priority.

Further, in the fourth embodiment, when a document area is detected, it is determined whether the divided area 480 can display the whole of the operation portion 48c in the order of divided areas 480 with higher priority.

First, it is determined whether the whole of the operation portion 48e can be displayed in the divided area 480A of the first priority. Here, it is determined whether there exists an area sufficient for displaying the operation portion 48c of the initial setting size in the divided area 480A of the first priority. If it is possible to display the whole of the operation portion 48c in the divided area 480A, the operation portion 48c is displayed in the divided area 480A. If the whole of the operation portion 48c cannot be displayed in the divided area 480A, it is determined whether the whole of the operation portion 48c can be displayed in the divided area 480B of the next lower priority. The determination is made likewise thereafter in the order of higher priority. As can be seen, in the fourth embodiment, the operation portion 48c is displayed in any one of the divided areas 480A to 480D in accordance with the order of priority.

According to the fourth embodiment, since the order of priority for displaying the operation portion 48c is set to each of the plurality of divided areas 480, the operation portion 48c is to be displayed with regularity. Thus, the user can predict an area in which the operation portion 48c is to be displayed.

Modifications of the third embodiment and the fourth embodiment can also be applied to the second embodiment. Also, a modification of the fourth embodiment can be applied to the third embodiment. However, in the case of applying the modification of the fourth embodiment to the third embodiment, it is first determined whether the divided area 480 can display the whole of the operation portion 48c in the order of divided areas 480 with higher priority. Then, when there does not exist an area sufficient for displaying the operation portion 48c of the initial setting size in any of the divided areas 480, the display size of the operation portion 48c is reduced. Also, when there is an area sufficient for displaying the operation portion 48c in one of the divided areas 480, the display size of the operation portion 48c may be increased.

Further, the specific numerical values, screen configurations, and the like described in the above embodiments are merely examples, and can be modified as appropriate according to the actual product.

Furthermore, as regards each step of the flowchart indicated for the embodiments described above, as long as the same result can be obtained, the processing order can be changed as appropriate.

REFERENCE SIGNS LIST

10 Image forming apparatus
12 Housing
14 Image former
16 Sheet discharge portion
48 Display panel
48a Display portion
48b Image reader
48c Operation portion
82 CPU
110 Home screen

The invention claimed is:

1. An image reading apparatus comprising:
   a housing;
   a display panel, which serves as a display portion that displays an image, an operation portion that receives an input operation by a user, and an image reader that reads a document;
   a detector that detects a document area where the document exists in a display area of the display panel; and
   a display controller that causes the operation portion to be displayed at a position according to the document area detected by the detection means, in the display area of the display panel,
   wherein the display panel constitute a top panel of the housing,
   the display area of the display panel is divided into a plurality of divided areas;
   an order of priority that displays the operation portion is set to each of the plurality of divided areas; and
   the display controller causes the operation portion to be displayed in one of the plurality of divided areas in accordance with the order of priority.

2. The image reading apparatus according to claim 1, wherein the display controller causes the operation portion to be displayed in an off-document area outside the document area.

3. The image reading apparatus according to claim 2, wherein the display controller causes the operation portion to be displayed at a position where the document area and a part of the operation portion are located within a predetermined distance from each other.

4. The image reading apparatus according to claim 1, wherein the display controller changes a display size of the operation portion according to the document area.

5. An image forming apparatus comprising the image reading apparatus according to claim 1.

6. The image forming apparatus according to claim 5, wherein the display panel constitutes a top plate of a housing of the image forming apparatus.

7. A non-transitory storage medium storing a control program executed by one or more processors of an image reading apparatus comprising a display panel, which serves as a display portion that displays an image, an operation portion that receives an input operation by a user, and an image reader that reads a document, a display controller, and a housing, the display panel constituting a top plate of the housing, wherein the control program causes the one or more processors of the image reading apparatus to function as:
  detecting a document area where the document exists in a display area of the display panel; and
  causing the operation portion to be displayed at a position according to the document area detected by the detection means, in the display area of the display panel,
  wherein the display area of the display panel is divided into a plurality of divided areas;
  an order of priority that displays the operation portion is set to each of the plurality of divided areas; and
  the display controller causes the operation portion to be displayed in one of the plurality of divided areas in accordance with the order of priority.

8. A control method executed by one or more processors of an image reading apparatus comprising a display panel, which serves as a display portion that displays an image, an operation portion that receives an input operation by a user, and an image reader that reads a document, a display controller, and a housing, the display panel constituting a top plate of the housing, the control method comprising:
  (a) detecting a document area where the document exists in a display area of the display panel; and
  (b) causing the operation portion to be displayed at a position according to the document area detected in the step (a), in the display area of the display panel,
  wherein the display area of the display panel is divided into a plurality of divided areas;
  an order of priority that displays the operation portion is set to each of the plurality of divided areas; and
  the display controller causes the operation portion to be displayed in one of the plurality of divided areas in accordance with the order of priority.

\* \* \* \* \*